July 27, 1943.   B. M. HOLT ET AL   2,325,516
APPARATUS FOR EXECUTING REACTIONS WITH THE AID
OF REGENERATIVE CONTACT MATERIALS
Filed Aug. 20, 1940
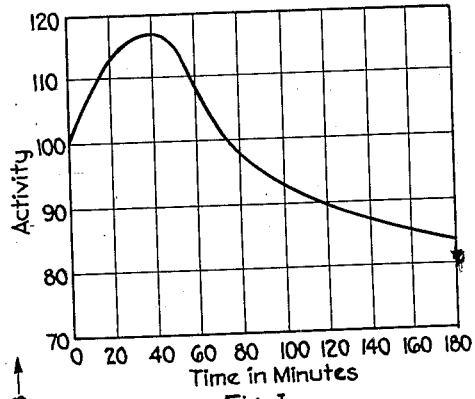
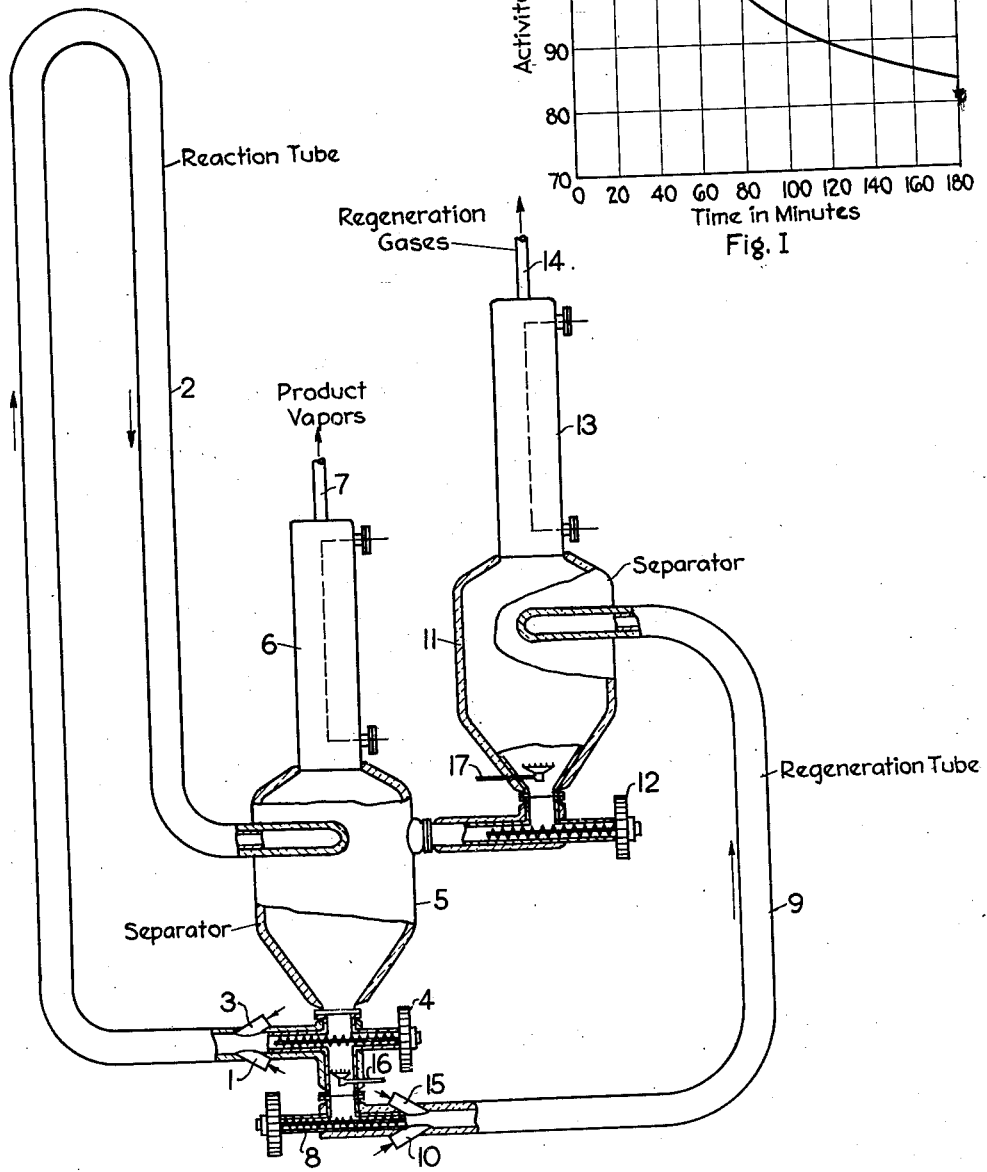
Inventors: Benjamin Merrill Holt
George Edward Liedholm
By their Attorney:

Patented July 27, 1943

2,325,516

UNITED STATES PATENT OFFICE 2,325,516

APPARATUS FOR EXECUTING REACTIONS WITH THE AID OF REGENERATIVE CONTACT MATERIALS

Benjamin Merrill Holt and George Edward Liedholm, Long Beach, Calif., assignors to Shell Development Company, San Francisco, Calif., a corporation of Delaware Application August 20, 1940, Serial No. 353,392

1 Claim. (Cl. 196—52)

The present invention relates to a method and apparatus for the continuous execution of reactions, and particularly endothermic vapor phase reactions, with the aid of regenerative contact materials. One aspect of the invention relates to a method and apparatus for the execution of reactions with the aid of moving regenerative contact materials, particularly finely divided or dust catalysts. Other more particular aspects of the invention relate to catalytic hydrocarbon treatments such, in particular, as catalytic cracking, catalytic reforming, catalytic cyclization, catalytic desulfurization, catalytic dehydrogenation, and catalytic isomerization.

The execution of reactions at elevated temperatures with the aid of solid catalysts or contact materials is usually accomplished by supporting the contact material in a fixed bed and passing the reactants thereover under suitable reaction conditions. For the execution of many reactions this simple system is quite satisfactory. This method, however, when applied to processes involving the use of regenerative contact materials has numerous inherent disadvantages which detract from its general usefulness and in many cases prevent its economical application. In these processes the contact material gradually loses its catalytic activity as the reaction progresses and must be periodically regenerated. This is done by burning deposited carbonaceous material from the surface of the contact material under carefully controlled conditions. The conditions for the regeneration must be carefully regulated between certain critical limits in order to avoid local overheating and permanent deactivation to the contact material. It is furthermore quite costly since it is time-consuming, incurs losses of processed material, and requires the circulation of large quantities of regenerating and flushing gases. Another inherent disadvantage of these methods is that the temperature of the apparatus continually fluctuates between that of the process and that of the regeneration. This causes excessive strains due to contraction and expansion and is detrimental to the apparatus. In many of the processes employing regenerative contact materials the decline in the activity of a contact material is quite rapid, allowing only very short on-stream or conversion periods. Thus, for example, in dehydrogenation processes the on-stream periods employed are generally in the order of one hour, and in catalytic cracking processes they are usually in the order of only ten minutes. The ratio of the on-stream time to the regeneration time in such processes using these methods is very low. This allows only a relatively small through-put capacity per reactor, requires the use of complicated automatic valves to accommodate the frequent switch from on-stream to regeneration and vice versa, and is at the least a great disadvantage.

In view of the great technical difficulties encountered in many cases in the use of regenerative contact materials in rigidly-fixed beds, various attempts have been made to develop processes in which the contact material is passed in a finely divided form through the reaction zone with or countercurrent to the reactants. Several distinct advantages may be realized with these systems. The first and foremost of these advantages is that the contact material may be continuously regenerated outside of the reaction zone. This eliminates the discontinuity of the process, and since the conversion zone and regeneration zone are separated and maintained at their respective optimum of temperatures, the apparatus may be fabricated from more suitable and less expensive materials. Furthermore, since the contact material may be regenerated continuously the process may be effected with fresh, regenerated contact material having a higher activity.

We have studied the use of moving streams of regenerative contact materials in such processes and have invented a process and apparatus wherein the available activities of the contact material are utilized to a greater extent and better conversions are obtained in a practical and continuous manner. The superior results which may be realized according to the method of the present invention are obtained by taking advantage of a peculiar property of regenerative contact materials. Regenerative contact materials in general do not exhibit their maximum activity immediately following regeneration as might be supposed, but after a short period of use. Thus, for example, if the activity of a given regenerative contact material (as expressed in terms of the conversion obtainable therewith under any fixed set of conditions) is determined for the freshly-regenerated material and for the same material after it has been in use for various lengths of time, it is found that the activity rises at first, passes through a maximum, and then gradually diminishes. This behavior of regenerative contact materials is illustrated in the attached graph, Figure I, showing the change in activity (expressed in arbitrary units) of a typical chromium oxide catalyst when used for the cyclization-dehydrogenation of pure normal heptane at a temperature of 530° C. and a contact time of about nine seconds under a pressure of about one atmosphere. In Figure I, the activity of the contact material is plotted on the ordinate, considering the activity of the freshly-regenerated material to be 100. The contact time plotted on the abscissa is a function of the time of use of the contact material and the rate at which the reactants are contacted therewith. Referring to the graph, it will be seen that the freshly-regenerated catalyst has an activity corresponding to 100. During use this activity gradually increases, passes through a maximum of 117 after about forty minutes, and then gradually decreases, arriving again at the initial activity after about 72 minutes. In the process of the present invention advantage is taken of this maximum activity of the catalyst. This is effected by recycling the catalyst and controlling the number of cycles between successive regenerations such that the average contact of the catalyst corresponds to the maximum catalytic activity.

The curve shown in Figure I is, we have found, generally typical of regenerative contact masses. The position of the maximum point may be shifted, however, to the right or left depending upon the particular contact material, particular conditions, etc. Thus, for example, when employing a contact agent comprising a catalytically active metal or metal compound, the position of the maximum activity may usually be displaced toward the right by the addition of relatively small amounts of basic-acting oxides, or toward the left by the incorporation of small amounts of certain promoters such as the metals of the 8th group of the periodic system. The lapse of time between the start of the conversion and the point of maximum activity of the contact material (with any given space velocity) we designate as the "induction period." In most cases the induction periods of regenerative contact materials are relatively short, varying from a few seconds up to about an hour. In some cases, however, they may be quite long. Thus, for example, one regenerative contact material investigated, comprising chromium oxide, aluminum oxide and potassium hydroxide, showed an induction period of about 4 hours. In general, the longer the induction period the flatter the activity curve becomes, and the increase of activity at the maximum becomes less noticeable. With many regenerative contact materials, however, where the induction period is quite short, the maximum activity may be considerably greater than the activity of the freshly-regenerated contact material. Thus, at the maximum point, the activity of the contact material may easily be in the order of 200% to 300% of the initial activity.

In the execution of reactions wherein a regenerative contact material in a finely divided state is passed through the reaction zone with or counter-current to the reactant vapors, the time of contact in the reaction zone, even when the reaction zone is quite long, is generally very short and is only a small fraction of the time of contact usually employed when the contact material is rigidly supported in a bed. If the contact material, after passing through the reaction zone, is regenerated as has been suggested in several instances, it consequently is employed at or near its initial activity. Referring to the attached Figure I, it is seen that this is not the optimum activity of the contact material. In order to exhibit its maximum activity the contact material must therefore be recycled through the reaction zone a plurality of times between successive regenerations. By taking into consideration the shape of the activity-time curves for various regenerative contact materials, we have calculated that, in general, with a more or less symmetrically-shaped maximum in the activity curve the optimum residence time for the finely divided contact material between successive regenerations is between about 1 and 3 and usually about 1.5 times the induction period. While this is usually about the optimum time it may vary somewhat with different contact materials and may be more accurately calculated by simple means once the activity-time curve, such as illustrated in Figure I, is known. As stated above, the activity-time curve and induction period may be easily determined beforehand by employing a quantity of the contact material in a fixed bed in a suitable laboratory reaction tube and determining the percent conversion at frequent intervals of time. The optimum number of passes for any given contact material in any given process may then be calculated by dividing the optimum time of contact by the time of contact per pass.

According to the process of the present invention, the number of passes of the contact material through the reaction zone between successive regenerations is adjusted to the optimum value by withdrawing and regenerating the proper proportion of the recycled contact material. Thus, in the process of the invention, a fraction of the total recycled contact material is continuously withdrawn and regenerated, said fraction being such a part of the whole contact material recycled that the residence time of the largest proportion of the particles of contact material in the reaction zone is between 1 and 3, and usually about equal to 1 to 2, times the induction period of the contact material.

The recycling of the contact material through the reaction zone may be effected in any one of the conventional ways and at any desired rate. Also, the regeneration of the desired proportion of the recycled contact material may be effected exterior to the reaction zone by any of the conventional methods. The invention in its broader aspect is, therefore, not restricted to any particular type or construction of apparatus. One advantageous method for carrying out the present process is to pass the contact material in the form of small particles or as a dust along with the reactant vapors through an elongated reaction zone and to continuously regenerate a portion of the recycled contact material in a similar elongated regeneration zone. The method may be applied with particular advantage in an apparatus such as illustrated in Figure II of the drawing. This apparatus allows the process of the invention to be executed continuously with a maximum economy of heat and high efficiency and is particularly useful for the execution of vapor phase reactions with finely divided regenerative contact materials which are not unduly sensitive to traces of water vapor. Referring to Figure II, reactant vapors are continuously introduced via an inlet 1 into an elongated reaction tube 2. A second reactant, diluent, or other gas desired to be present in the reaction zone may be introduced via inlet 1 or via a separate inlet 3. In most cases where the reaction is executed at at an elevated temperature the vaporous reactant or reactant mixture is introduced into the reaction zone in a preheated condition. The preheating of the feed, being a conventional operation, may be effected in any of the conventional ways including heat interchange with reacted vapors and/or spent regeneration gases and is not shown in the drawing.

Finely divided contact material is continuously fed to the reaction tube 2 by a feeding device 4 and is continuously picked up by the entering reactant vapors and carried therewith through the reaction tube 2. The reaction tube 2 is preferably predominantly vertically disposed and is of such cross-section that the contact material may be carried therethrough without undue settling and of a length sufficient to afford a suitable contact time per pass. In such cases where the reaction is neither highly endothermic or exothermic and takes place at moderate temperatures, the reaction tube may be uncovered or heat insulated, as shown. In such cases where the reaction is highly exothermic it may be desirable to provide a means such as a cooling jacket to cool all or a part of the reaction tube, and conversely, in such cases where the reaction is highly endothermic, a suitable heating means such as a steam jacket or the like may be provided. The apparatus as shown is most suitable for reactions which are neither highly endothermic nor highly exothermic and in which all of the required heat may be supplied to the reaction zone by means of the preheated reactant vapors and/or the hot recycled contact material.

The reacted vapors and suspended contact material pass through the reaction zone in tube 2 to a separating device 5 wherein the solid contact material is separated from the reacted vapors. The separating device diagrammatically shown at 5 may be of any conventional type such as the conventional cyclone type and those relying upon baffles, screens, filters, electrical precipitation, and the like. A single separating device may often be sufficient. In some cases, however, the reactant vapors after passing through a mechanical separator 5 contain a small amount of very finely divided contact material produced by attrition in the process. In order to recover this material the reacted vapors may also be passed through a supplementary separating device 6 wherein extra fine contact material is removed by electrical precipitation. The vaporous reaction products are removed from the apparatus via exit line 7.

The contact material in separator 5, in the form of dry, loose, free-flowing particles is continuously recycled to the reaction zone by the feeding device 4 and a fixed proportion thereof is continuously withdrawn via feeding device 8 to a regeneration tube 9. The regeneration of the contact material in the regeneration tube is effected in a manner quite similar to the reaction proper, i. e. while the contact mass is being transported through the regeneration tube in a stream of gaseous regenerating medium. Any of the conventional regenerating media capable of oxidizing the carbonaceous deposits from the contact material may be applied. The present method, however, is not restricted to the use of very mild regenerating media having low concentrations of oxygen and gases such as air having a high concentration of oxygen may usually be employed without any harmful effects upon the activity of the contact material. Thus, a suitable regenerating medium such as air, air plus steam, air plus flue gas, steam plus flue gas, or the like, introduced into the regeneration tube 9 via an inlet 10 picks up the contact material from feeding device 8 and carries it through the regeneration tube 9 to a separating device 11 wherein the regenerated contact material is separated from the spent regenerating gas. Unless exceptionally high temperatures are employed in the reaction zone the regeneration will not take place by simply transporting the contact material through tube 9 with a regenerating gas. In order to effect regeneration the temperature in the regeneration zone must be raised to the ignition temperature of the carbonaceous deposits. This may be very simply effected when starting the process by injecting burning gas with an excess of oxygen via inlets 10 and/or 15 until the desired ignition temperature is reached, or by preheating the regeneration gas prior to injecting it into the regeneration zone. Once the combustion (regeneration) in tube 9 is started it will continue by its own heat of reaction. The spent regenerating gas may also, if desired, be passed through a secondary separator 13 to recover extra fine material prior to discharging it via outlet pipe 14.

The regenerated contact material collected in separator 11 is fed back to the recycled contact material by a feeding device 12. During the regeneration in tube 9 the contact material being regenerated and transported to separator 11 takes up a quantity of heat proportional to the prevailing regeneration temperature and the specific heat of the contact material. The contact material collected in separator 11 and fed back to separator 5 is usually, for example, at a temperature of from about 900° F. to 1500° F., depending upon the regeneration conditions. The recycling of this hot regenerated contact material to the reaction zone serves to supply a considerable portion of the necessary heat, thus materially decreasing the amount of heat to be supplied by the preheated vapors. In fact, when executing endothermic reactions it is possible to supply the total endothermic heat of reaction by means of this recycled contact material, according to the method described in copending application, Serial No. 350,822, filed August 3, 1940. When operating the present process according to the method of said copending application a gaseous, liquid or powdered fuel to supply the necessary heat to the regenerating contact material may be introduced into the regeneration zone via inlets 10 and/or 15.

When employing finely divided catalysts according to the process of the present invention the process is preferably executed in the substantial absence of a liquid phase. Thus, particularly when treating higher boiling materials, the feed is preferably completely vaporized prior to entering the reaction zone. This may usually be easily effected by simply preheating the feed. In certain cases, however, for instance when cracking heavy hydrocarbon fractions, it may be necessary to first vaporize and dilute the feed with steam.

In some cases when employing contact materials which are sensitive to water vapor, it may be desirable to subject the freshly regenerated contact material collected in separator 11 to a drying treatment. This may be effected in any one of a number of ways. One suitable method by which the contact material may be dried sufficiently for most purposes is to inject a small stream of dry gas into the separator at a point within the hot settled contact material and preferably just above the outlet to the feeding device. Provision for the injection of such a gas is shown at 17. A small quantity of a dry, and preferably hot, gas such as dried flue gas, dried air, methane, natural gas or the like by passing up through the hot layer of contact material is sufficient to remove the larger part of any adsorbed water. Thus, in the dehydrogenation of hydrocarbons and the reforming of gasoline distillates, using a dehydrogenating catalyst comprising an oxide or a sulfide of a metal of the sixth group of the periodic table, a considerable improvement in the results is possible by this simple expedient. Also, an inlet 16 may, if desired, be provided between feeding devices 4 and 8. A small amount of inert gas injected via inlet 16 tends to flush the contact material of adsorbed reactants.

The process and apparatus of the present invention are generally applicable for executing catalyzed reactions in the vapor phase and are especially advantageous for the conversion of organic materials at elevated temperatures where the contact material is relatively quickly coated with carbonaceous deposits. Particular processes for which the present process and apparatus are suited are, for example, the catalytic dehydrogenation of hydrocarbons such as butane, propane, cyclohexane, etc., the catalytic cyclization of open-chain paraffin and olefine hydrocarbons having from 6 to 12 carbon atoms, the catalytic reforming of gasoline and similar petroleum distillates, the catalytic isomerization of olefinic hydrocarbons such as butene, pentene, hexene, etc., the catalytic isomerization of paraffin hydrocarbons such as butane, etc., the catalytic desulfurization of vaporizable petroleum fractions, and the cracking of hydrocarbons with regenerative contact catalysts. The temperatures, pressures, catalysts and other conditions applicable and preferred in these various processes are well known and may be found in the numerous patents and scientific articles relating thereto.

The catalysts employed in the process of the invention are preferably in a finely divided state and should be relatively free-flowing. By "finely divided state" we mean in the form of pieces having an average diameter of not more than about 5 mm. Although relatively coarse particles such as 8-10 mesh particles may be employed, it is found that due to the erosion in the process the contact material is considerably finer and may, after long use, even approach an average diameter of 1-5 microns. The various contact materials may be prepared in a finely divided state for use in the process or may be first prepared in the ordinary manner and subsequently crushed or ground to the desired degree of fineness. The composition of the contact material will depend, of course, upon the particular process under consideration. In general, any of the many solid contact materials commonly used in these processes may be ground or crushed and applied according to the present method. For example, in catalytic dehydrogenation and reforming processes a conventional dehydrogenation or reforming catalyst such as active alumina, certain treated bauxites, or supported catalytic metal oxides or sulfides such as those of Cr, Mo, W, etc. may be used. In catalytic cracking processes, on the other hand, any of the conventional partially hydrated silica-alumina, silica-fluoride and silica-alumina-zirconia catalysts may, for example, be employed. In such cases where the contact material comprises one or more metals or metal compounds supported upon a relatively inert carrier material, it is advantageous to choose a carrier material which is capable of withstanding repeated use with a minimum of degradation. Alumina, magnesia, and aluminum silicates are quite suitable. Thus, a metal oxide, for example chromium oxide, may be deposited upon one of these materials, for example crushed activated alumina. These catalysts are especially light in weight, adsorptive and strong.

In the foregoing we have explained our invention in detail indicating various preferred embodiments thereof. Other suitable modifications, many of which may afford slightly more economical operation under certain circumstances, will at once be apparent to those skilled in the art. It is therefore to be understood that the invention is not limited to the exact form or forms described and that all such modifications as fall within the spirit of the invention are intended to be embraced in the language of the accompanying claim.

We claim as our invention:

An apparatus adapted for the execution of vapor phase reactions with continuous recycle of regenerative finely divided catalyst comprising an elongated reaction chamber communicating with a chamber means for separating finely divided solids from vapors, means for introducing reactant vapors into said reaction chamber, conveyor means for continuously feeding separated finely divided catalyst from said separating means to said reaction zone, an elongated regeneration chamber communicating with a second chamber means for separating finely divided solids from vapors, means for introducing regeneration gases into said regeneration chamber, conveyor means for feeding separated finely divided catalyst from said second separating chamber to said first separating chamber, conveyor means for continuously feeding separated finely divided catalyst from said first separating means to said regeneration chamber, said last conveyor means being disposed below said first conveyor means, and means disposed between said first and last conveyor means for introducing an inert gas.

BENJAMIN MERRILL HOLT.
GEORGE EDWARD LIEDHOLM.